United States Patent
Sezille

(10) Patent No.: US 8,064,645 B1
(45) Date of Patent: Nov. 22, 2011

(54) METHODS AND SYSTEMS FOR AUTHENTICATING USERS

(75) Inventor: Nicolas Jacques Jean Sezille, Dublin (IE)

(73) Assignee: Daon Holdings Limited, George Town (KY)

( * ) Notice: Subject to any disclaimer, the term of this patent is extended or adjusted under 35 U.S.C. 154(b) by 0 days.

(21) Appl. No.: 13/204,882

(22) Filed: Aug. 8, 2011

Related U.S. Application Data

(63) Continuation of application No. 13/010,443, filed on Jan. 20, 2011.

(51) Int. Cl.
*G06K 9/36* (2006.01)

(52) U.S. Cl. .......................... 382/115; 382/124; 382/294

(58) Field of Classification Search ................... 382/115, 382/117, 118, 124, 294, 296, 298; 340/5.82, 340/5.83
See application file for complete search history.

(56) References Cited

U.S. PATENT DOCUMENTS

| | | | |
|---|---|---|---|
| 5,493,621 A | 2/1996 | Matsumura | 382/125 |
| 5,862,249 A | 1/1999 | Jang et al. | 382/132 |
| 5,991,429 A | 11/1999 | Coffin et al. | 382/118 |
| 6,128,398 A | 10/2000 | Kuperstein et al. | 382/118 |
| 6,314,197 B1 | 11/2001 | Jain et al. | 325/125 |
| 6,487,306 B1 | 11/2002 | Jain et al. | 382/125 |
| 6,546,122 B1 | 4/2003 | Russo | 382/125 |
| 6,901,155 B2 | 5/2005 | Xia et al. | 382/125 |
| 7,110,581 B2 | 9/2006 | Xia et al. | 382/124 |
| 7,136,514 B1 | 11/2006 | Wong | 382/124 |
| 7,151,846 B1 | 12/2006 | Fujii | 382/125 |
| 7,233,686 B2 | 6/2007 | Hamid | 382/124 |
| 7,327,859 B1 | 2/2008 | Chau | 382/116 |
| 7,382,906 B2 | 6/2008 | Meier | 382/125 |
| 7,391,891 B2 | 6/2008 | Hillhouse | 382/124 |
| 7,400,749 B2 | 7/2008 | Hillhouse | 382/124 |
| 7,474,773 B2 | 1/2009 | Chau | 382/124 |
| 7,508,969 B2 | 3/2009 | Shinbata | 382/132 |
| 7,676,068 B2 | 3/2010 | Cervantes | 382/115 |
| 7,692,165 B2 | 4/2010 | Winkler | 250/492.21 |
| 7,697,730 B2 | 4/2010 | Okamura et al. | 382/115 |
| 7,742,626 B2 | 6/2010 | Kamata et al. | 382/115 |
| 7,773,870 B2 | 8/2010 | Naruse | 396/15 |
| 7,797,549 B2 | 9/2010 | Main et al. | 713/186 |
| 7,899,217 B2 | 3/2011 | Uludag et al. | 382/115 |

(Continued)

FOREIGN PATENT DOCUMENTS

EP  1 562 134 A2  8/2005

(Continued)

OTHER PUBLICATIONS

Wu et al. "Fusion of Multiple Features for Palmprint Authentication," Machine Learning and Cybernetics, 2006 International Conference on, Aug. 13-16, 2006, p. 3260.

(Continued)

*Primary Examiner* — Andrew W Johns

(74) *Attorney, Agent, or Firm* — Kevin McDermott, Esq.

(57) ABSTRACT

A method of authenticating users is provided that includes capturing biometric authentication data of a user and processing the captured biometric data into an image. Moreover, the method includes determining a region of interest of the image and a gray scale image from the image, determining an optimum transformation parameter set within the region of interest, and aligning the gray scale image with an enrollment gray scale image generated during enrollment of the user using results of the optimum transformation parameter set determination. Furthermore, the method includes extracting biometric feature data from the gray scale image and verifying an identity of the user with extracted biometric feature data included in a region of agreement.

18 Claims, 8 Drawing Sheets

U.S. PATENT DOCUMENTS

| | | | |
|---|---|---|---|
| 2004/0052405 A1 | 3/2004 | Walfridsson | 382/115 |
| 2004/0193893 A1 | 9/2004 | Braithwaite et al. | 713/186 |
| 2006/0078170 A1 | 4/2006 | Kamata et al. | 382/115 |
| 2007/0201727 A1 | 8/2007 | Birrell et al. | 382/115 |
| 2008/0065901 A1 | 3/2008 | Takaku et al. | 713/186 |
| 2008/0226136 A1 | 9/2008 | Takaku et al. | 382/115 |
| 2008/0298642 A1 | 12/2008 | Meenen | 382/115 |
| 2009/0208064 A1 | 8/2009 | Cambier | 382/110 |
| 2009/0243798 A1 | 10/2009 | Fukuda et al. | 340/5.82 |
| 2009/0245585 A1 | 10/2009 | Manabe et al. | 382/107 |
| 2009/0304237 A1 | 12/2009 | Yoshikawa et al. | 382/116 |
| 2010/0002927 A1 | 1/2010 | Kalayeh | 382/132 |
| 2010/0008545 A1 | 1/2010 | Ueki et al. | 382/115 |
| 2010/0033302 A1 | 2/2010 | Yamamoto | 340/5.82 |
| 2010/0135540 A1 | 6/2010 | Cervantes | 382/117 |
| 2010/0202665 A1 | 8/2010 | Mohammad et al. | 382/115 |
| 2010/0253471 A1 | 10/2010 | Abe | 340/5.83 |
| 2010/0316264 A1 | 12/2010 | Ferren et al. | 382/117 |
| 2010/0322484 A1 | 12/2010 | Hama et al. | 382/115 |
| 2010/0329568 A1 | 12/2010 | Gamliel et al. | 382/190 |
| 2011/0016317 A1 | 1/2011 | Abe | 713/169 |

FOREIGN PATENT DOCUMENTS

| | | |
|---|---|---|
| EP | 1 903 509 A1 | 3/2008 |
| EP | 2 107 499 A1 | 10/2009 |
| EP | 2 244 224 A1 | 10/2010 |
| JP | 2001-273498 A | 10/2001 |
| JP | 2008-070926 A | 3/2008 |
| JP | 2010-146158 A | 7/2010 |
| JP | 2010-152706 A | 7/2010 |

OTHER PUBLICATIONS

Patent Abstracts of Japan, Publication No. 2008-070926, publ. date Mar. 27, 2008.

Patent Abstracts of Japan, Publication No. 2001-273498, publ. date Oct. 5, 2001.

Patent Abstracts of Japan, Publication No. 2010-146158, publ. date Jul. 1, 2010.

Patent Abstracts of Japan, Publication No. 2010-152706, publ. date Jul. 8, 2010.

METHODS AND SYSTEMS FOR AUTHENTICATING USERS

CROSS-REFERENCE TO RELATED APPLICATIONS

This is a continuation application of U.S. patent application Ser. No. 13/010,443, filed Jan. 20, 2011.

BACKGROUND OF THE INVENTION

This invention relates generally to methods and systems for authenticating users over networks, and more particularly, to methods and systems of authenticating users with palm biometric data captured with devices readily available to users.

Known palm print biometric data capture devices are generally very high quality optical devices that capture images at resolutions ranging from about five hundred to one thousand dots per inch. Such palm print data capture devices typically include a platen and an instrument positioned a fixed distance from the platen. During operation, a palm is placed on the platen in a known orientation and the instrument captures an image of the palm. Because the palm is placed on the platen, the orientation and size of the palm print may be accurately determined during operation. Such palm print capture devices are known to capture very high quality images that include biometric features such as, but not limited to, ridge lines and minutia points. Minutia points and ridge lines are also present in fingerprint biometric data. Consequently, police departments and other similar law enforcement agencies typically have access to palm print biometric data capture devices because such agencies prefer to capture palm print biometric data as well as fingerprint biometric data when booking suspects.

However, existing palm print capture devices are generally large and cumbersome, and include complex sensitive components that may be damaged when moved. Thus, known palm print data capture devices are not typically portable. Moreover, palm print capture devices are not available to the general public because they are typically located at law enforcement agencies. Furthermore, by requiring palm placement on the platen in a known orientation, existing palm print capture devices do not allow for moving a hand freely in space while capturing the palm biometric data. Thus, palm print biometric data may not be captured for physically handicapped individuals incapable of placing their palms on the platen in the required orientation. Additionally, known palm print capture devices are expensive.

As a result, capturing palm print biometric data with known palm print biometric capture devices may be inconvenient or impossible for members of the general public, and may be expensive.

BRIEF DESCRIPTION OF THE INVENTION

In one aspect, a method of authenticating users is provided that includes capturing biometric authentication data of a user and processing the captured biometric data into an image. Moreover, the method includes determining a region of interest of the image and a gray scale image from the image, determining an optimum transformation parameter set within the region of interest, and aligning the gray scale image with an enrollment gray scale image generated during enrollment of the user using results of the optimum transformation parameter set determination. Furthermore, the method includes extracting biometric feature data from the gray scale image and verifying an identity of the user with extracted biometric feature data included in a region of agreement.

In another aspect, a system for authenticating a user is provided that includes an authentication system including an authentication database. The authentication system is configured to communicate with devices and to store within the authentication database authentication data for a plurality of users. Moreover, the system includes a device configured to communicate with at least the authentication system and to capture authentication data. The authentication system is further configured to determine a region of interest of authentication data captured by the device, and calculate a transformation for aligning the region of interest with an enrollment region of interest determined during enrollment of the user in the authentication system.

In yet another aspect, a method for authenticating a user is provided that includes capturing authentication data from the user and processing the captured authentication data into an image, determining a region of interest of the image, and calculating a transformation for aligning the region of interest with an enrollment region of interest determined during enrollment of the user.

DETAILED DESCRIPTION OF THE INVENTION

Figure 1:
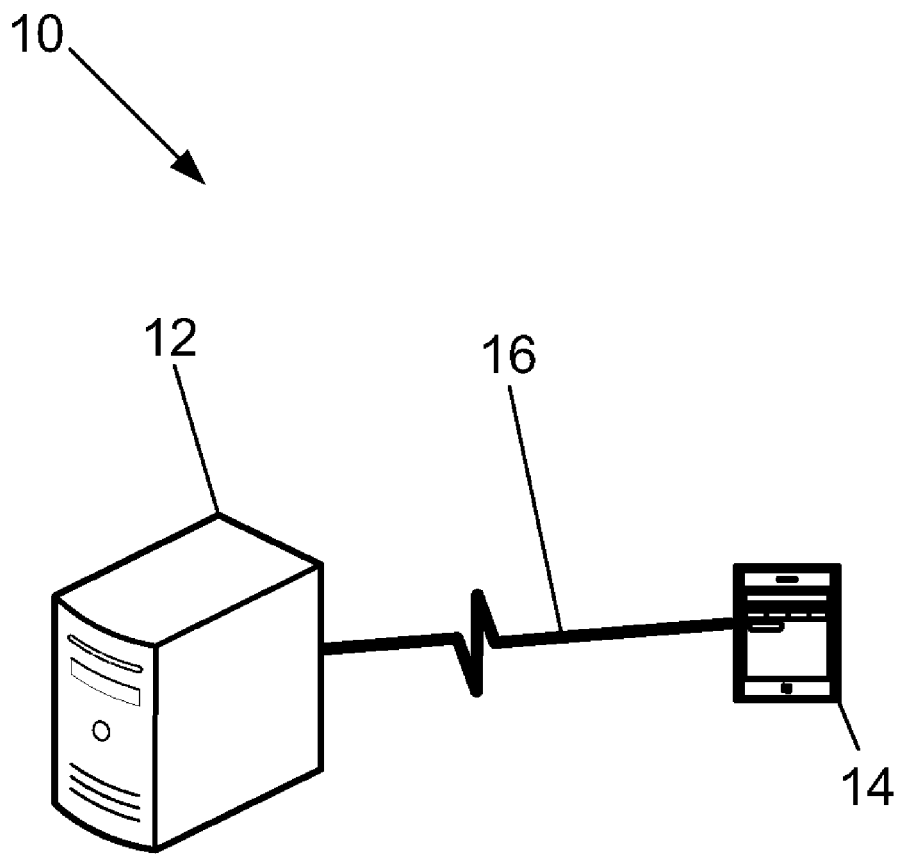
FIG. 1 is a block diagram of an exemplary embodiment of an Authentication Computer (AC) System for authenticating users.

FIG. 1 is an expanded block diagram of an exemplary embodiment of a system architecture of an Authentication Computer (AC) System 10 for authenticating the identity of a user. More specifically, the AC system 10 includes a Biometric Authentication Computer (BAC) System 12 and a device 14.

The BAC system 12 includes components such as, but not limited to, a web server, a disk storage device, a database management server and an authentication server arranged to be combined into a single structure. Although these components are combined into a single structure in the exemplary embodiment, it should be appreciated that in other embodiments these components may be separately positioned at different locations and operatively coupled together in a network such as, but not limited to, a local area network (LAN), a wide area network (WAN) and the Internet. The disk storage device may be used for storing any kind of data including, but not limited to, enrollment data records of individuals, rotation angles, scale factors, coordinates and correlation factors. The database management server may be used to facilitate transferring data to and from the disk storage device. The authentication server is configured to perform matching of any feature or information associated with individuals to authenticate the identity of individuals as described herein.

The BAC system 12 is configured to wirelessly communicate with the device 14 over a communications network 16 in the exemplary embodiment. Moreover, the BAC system 12 is operable to facilitate authenticating identities of users operating the device 14. In the exemplary embodiment, the communications network 16 is a 3 G communications network. However, it should be appreciated that in other embodiments the communications network 16 may be any network that facilitates authentication as described herein, such as, but not limited to, W-Fi, Global System for Mobile (GSM), Enhanced Data for GSM Environment (EDGE), a LAN, a WAN and the Internet. The BAC system 12 is also operable to calculate transformations, apply the transformations to biometric data and images, determine coordinates of points, apply rotation angles and scale factors to biometric data and images, and calculate correlation factors.

The BAC system 12 is operable to store authentication data. In the exemplary embodiment, the authentication data is palm biometric data. In other embodiments, biometric authentication data corresponding to any biometric type may be used as the basis of authentication. Such biometric types include, but are not limited to, foot, face, fingerprint, iris, voice, vascular patterns and hand signatures. Thus, the BAC system 12 is operable to store biometric authentication data and is operable to use the biometric authentication data to authenticate identities of users. Using biometrics as the basis for authentication facilitates enhancing trust in the authentication result. In order to facilitate properly authenticating users, in the exemplary embodiment the BAC system 12 stores biometric authentication data in the form of enrollment data records for each of a plurality of enrolled users. Biometric data to be used as the basis of authentication is captured from users during enrollment and is stored as enrollment data records in the BAC system 12. Moreover, the biometric data may take any form such as, but not limited to, images, photographs, templates and electronic data representations.

Although the enrollment data records include biometric data in the exemplary embodiment, it should be appreciated that in other embodiments the enrollment data records may include any kind of authentication data including, but not limited to, biographic data, and may include any combination of authentication data for each authorized user. Moreover, it should be appreciated that in other embodiments the enrollment data records may include biographic data, in addition to the biometric data, for each enrolled user that is associated with the enrolled user's biometric data.

The BAC system 12 may store authentication policies therein which are used to determine data that is to be obtained from a user attempting to enroll in the BAC system 12. Moreover, additional authentication policies may be used to determine data to be obtained from a user requesting biometric authentication with the device 14.

The term "biographic data" as used herein includes any demographic information regarding an individual as well as contact information pertinent to the individual. Such demographic information includes, but is not limited to, an individual's name, age, date of birth, address, citizenship and marital status. Contact information collected in the exemplary embodiment includes devices and methods for contacting the enrolled user.

The device 14 is configured to wirelessly communicate with at least the BAC system 12 over the network 16. Moreover, in the exemplary embodiment, the device 14 is operable to capture authentication data from users. The device 14 includes at least one of buttons and icons operable to at least enter commands, enter data and invoke applications stored therein. Moreover, the device 14 includes a display screen such as, but not limited to, a Liquid Crystal Display (LCD), and is operable to display any text or image on the display screen. In the exemplary embodiment, the device 14 is a smart phone operable to at least display messages and images, capture authentication data from a user, and transmit the captured authentication data to the BAC system 12.

Although the device 14 is a smart phone in the exemplary embodiment, it should be appreciated that in other embodiments the device 14 may be any device capable of at least communicating with the BAC system 12, displaying messages and images, and capturing and transmitting data. Such other devices 14 include, but are not limited to, a tablet computer, a television, a camera, a personal desktop computer, a laptop computer, and a personal digital assistant (PDA). The device 14 may be used to obtain the authentication data stored as enrollment data records in the BAC system 12. Furthermore, authentication data obtained during authentication is captured using the device 14 in the exemplary embodiment. It should be appreciated that in other embodiments the enrollment data records may be obtained in any manner that facilitates authenticating the identity of users as described herein, including, but not limited to, loading the required authentication data into the BAC system 12 from external identity management systems or human resource management systems.

The memories (not shown) in the BAC 12 and the device 14 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each memory (not shown) can be a computer-readable recording medium used to store data in the BAC system 12 and the device 14, and store computer programs or executable instructions that are executed by the BAC system 12 and the device 14. Moreover, the memory (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program.

Figure 2:
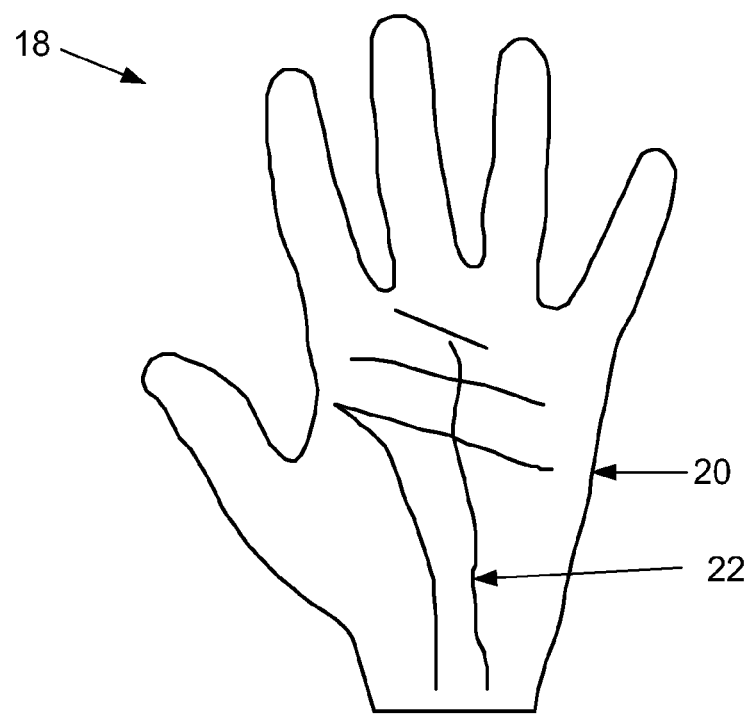
FIG. 2 is a plan view of an exemplary palm image captured during enrollment.

FIG. 2 is a plan view of an exemplary palm image 18, including an outline 20 of the palm and biometric features 22, captured during enrollment in the BAC system 12. The palm image 18 constitutes biometric data captured from a user with the device 14. In the exemplary embodiment, the biometric features 22 are lines and wrinkles. In other embodiments the biometric features 22 may be any biometric feature including, but not limited to, ridge lines and minutia points. The lines and wrinkles within the palm image 18 are determined and are included as data points in a generated biometric feature template. In the exemplary embodiment, the biometric features are extracted from the captured biometric data by the BAC system 12 and are included as data in a biometric feature template generated by the BAC system 12. Biometric feature templates are usually a compact representation of the biometric features included in the captured biometric data, and are used for authenticating individuals. The raw captured biometric data may be stored in the BAC system 12 or in a server system different than the BAC system 12.

Although the captured biometric data is from a palm in the exemplary embodiment, it should be appreciated that in other embodiments biometric data of different biometric types may be captured. Such different biometric types include, but are not limited to, face, voice, iris, and foot. Moreover, it should be appreciated that such different biometric types may have biometric features, different than wrinkles and lines, that can be extracted from the captured biometric data and included in a biometric feature template. For example, when iris biometric data is captured during authentication, phase information and masking information of the iris may be extracted from the captured iris biometric data and included in a biometric feature template. Although the captured biometric data is processed into a biometric feature template in the exemplary embodiment, it should be appreciated that in other embodiments the captured biometric data may be processed into any form that facilitates authenticating the individual, such as, but not limited to, photographs, images and electronic data representations.

Figure 3:
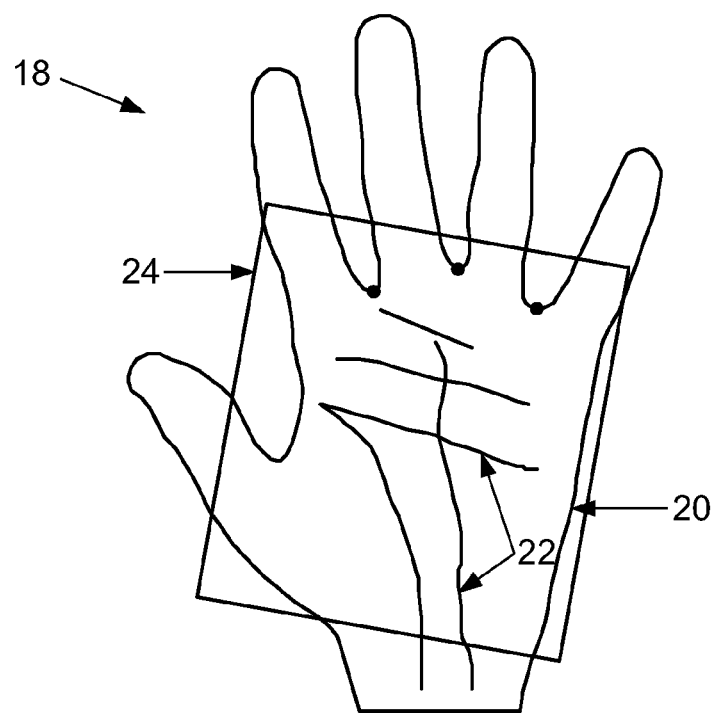
FIG. 3 is the plan view of the exemplary palm image as shown in FIG. 2 including a region of interest.

FIG. 3 is the plan view of the exemplary palm image 18 as shown in FIG. 2, further including an enrollment region of interest 24. In the exemplary embodiment, the enrollment region of interest 24 is square-shaped. However, in other embodiments the enrollment region of interest 24 may have any shape including, but not limited to, rectangle and circle. The enrollment region of interest 24 includes the palm of the hand.

Figure 4:
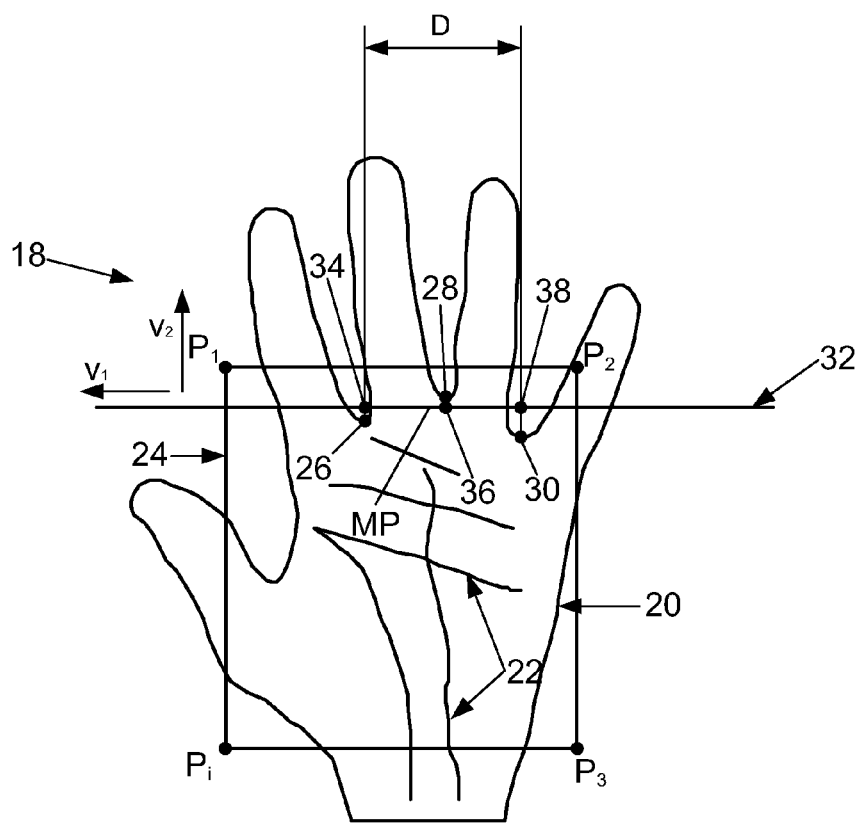
FIG. 4 is the plan view of the exemplary palm image as shown in FIG. 3, further including a best fit line.

FIG. 4 is the plan view of the palm image as shown in FIG. 3, further including a best fit line for use in constructing the enrollment region of interest 24. In the exemplary embodiment, the enrollment region of interest is constructed by first establishing coordinates of points 26, 28, 30. Points 26, 28, 30 are each positioned at the base between different fingers. Next, constructing the enrollment region of interest 24 continues by determining a line 32 that constitutes a best fit between points 26, 28, 30, and determining a normal projection from each point 26, 28, to the best fit line 32. Each normal projection intersects the best fit line to define further points 34, 36, 38, respectively. The coordinates of points 34, 36, 38 are determined. A distance D is determined between points 34 and 38 that may be referred to as a scale identifying number or a scale factor. Next, the coordinates of a midpoint MP between points 34 and 38 are determined, and a vector $v_1$ parallel to the best fit line and a vector $v_2$ normal to the best fit line 32 are determined. The scale identifying number D, the coordinates of the midpoint MP, and the vectors $v_1$ and $v_2$ are then substituted into the equation $P_i=MP+a_1Dv_1+b_1Dv_2$ to determine the coordinates of each corner of the region of interest 24. The designation "i" as used in conjunction with the corner points $P_i$, is intended to indicate that any number "i" of corner points, appropriate for any geometric shape, may be used that facilitates authenticating the identity of a user as described herein. It should be appreciated that $a_1$ and $b_1$ designate coefficients that facilitate determining the coordinates of corner points $P_i$. By virtue of determining the coordinates of points $P_i$ it should be appreciated that the enrollment region of interest 24 is defined.

Although the exemplary embodiment determines the enrollment region of interest 24 by calculating the coordinates of each corner using an equation, it should be appreciated that differently shaped enrollment regions of interest 24 may be determined using other methods, equations or mathematical relationships. It should be understood that the palm image 18 includes a first Cartesian coordinate system and that the coordinates calculated during construction of the enrollment region of interest 24 are from the first Cartesian coordinate system. It should also be understood that the enrollment region of interest 24 includes a second Cartesian coordinate system.

Figure 5:
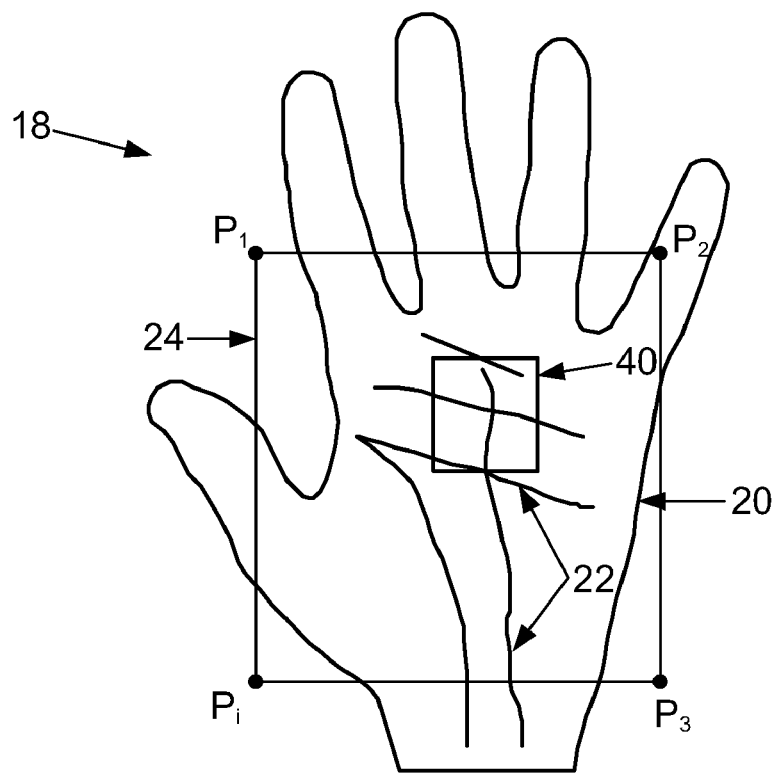
FIG. 5 is the plan view of the exemplary palm image as shown in FIG. 3 including a patch area.

FIG. 5 is the plan view of the palm image 18 as shown in FIG. 3, further including a patch area 40. In the exemplary embodiment, the patch area 40 is rectangular-shaped, has a fixed size that is smaller than the enrollment region of interest 24, and is positioned at a center of gravity of the palm. It should be understood that the patch area 40 is not merely a rectangular geometric shape superimposed on the palm. Rather, the patch area 40 represents a copy of a portion of the palm image 18 within the bounds of the patch area 40. The coordinates of the center of gravity of the palm are calculated in accordance with the second Cartesian coordinate system. Next, the center of the patch area 40 is positioned to be coincident with the center of gravity. Thus, after positioning the patch area 40 on the center of gravity, the center of the patch area 40 has the same coordinates as the center of gravity. In the exemplary embodiment sides of the patch area 40 are parallel to the sides of the enrollment region of interest 24. However, in other embodiments the sides of the patch area 40 are not parallel to the sides of the enrollment region of interest 24.

It should be understood that the position of the enrollment region of interest 24 and the position of the patch area 40 are not related. However, the patch area 40 is to be positioned completely within the enrollment region of interest 24. Although the patch area is rectangular-shaped in the exemplary embodiment, in other embodiments the patch area 40 may have any shape including, but not limited to, square and circle. Moreover, in other embodiments instead of positioning the center of the patch area 40 coincident with the center of gravity, the patch area 40 may be positioned at areas on the palm image 18 that have a higher density of biometric features than other areas of the palm image 18. A template of the patch area 40 and a template of the enrollment region of interest 24 are generated by the BAC system 12 and stored therein.

Figure 6:
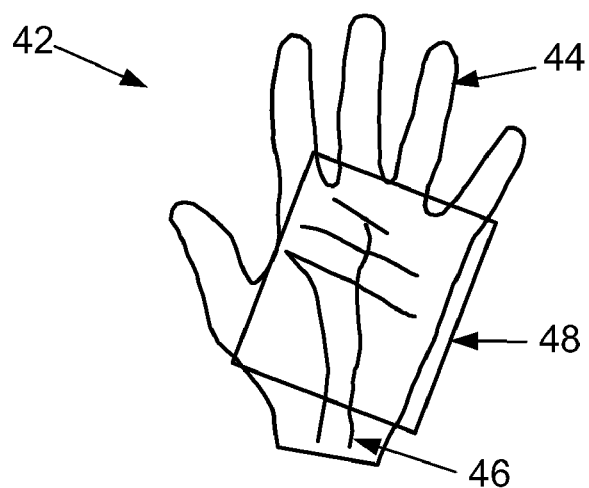
FIG. 6 is a plan view of an exemplary palm image captured during identity authentication.

FIG. 6 is a plan view of an exemplary palm image 42, including an outline 44 of the palm and biometric features 46, captured during authentication. It should be appreciated that the biometric data captured during authentication is captured at a different, but similar, orientation as the biometric data captured during enrollment in the BAC system 12. Moreover, the size of an image processed from the biometric data captured during authentication may be different than the size of an image processed from biometric data captured during enrollment in the BAC system 12. Thus, in order to properly align differently oriented and differently sized images of the same biometric type, in the exemplary embodiment, a region of interest associated with one of the images is selected to be manipulated. Specifically, the size of the selected region of interest is increased or decreased by a scale factor such that the selected region of interest size is substantially similar to the size of the a region of interest of the non-selected image. Furthermore, the selected region of interest is rotated to have substantially the same orientation as the non-selected region of interest. By thus manipulating the selected region of interest, the selected image and the non-selected image may be substantially aligned with each other.

For example, the palm image 42 of FIG. 6 is smaller than, and has a different orientation than, the palm image 18 of FIG. 5. By increasing the size of an authentication region of interest 48 associated with the palm image 42 and rotating the region of interest 48 counterclockwise, palm image 42 may be manipulated to be substantially the same size as the palm image 18 and to have substantially the same orientation as the palm image 18. By virtue of having substantially the same size and orientation, the palm images 18 and 42 may be substantially aligned with each other.

The biometric features 46 are lines and wrinkles in the exemplary embodiment. However, in other embodiments the biometric features 46 may be any biometric feature including, but not limited to, ridge lines and minutia points. The authentication region of interest 48 is determined in a substantially identical way as the enrollment region of interest 24. The authentication region of interest 48 has the same coordinate system as the enrollment region of interest 24. Thus, the authentication region of interest 48 includes the second Cartesian coordinate system.

Figure 7:
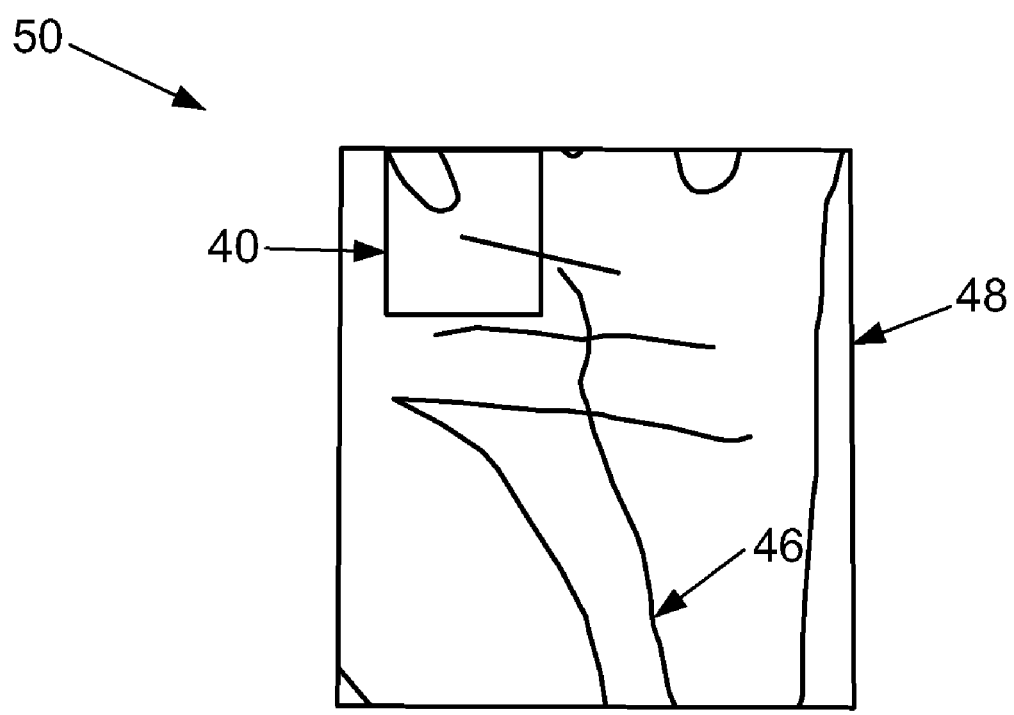
FIG. 7 is a plan view of the region of interest shown in FIG. 6 including the patch area.

FIG. 7 is a plan view of the palm image 42 located within the authentication region of interest 48. The palm image located within the authentication region of interest 48 is referred to herein as a gray scale image 50. The patch area 40 determined during enrollment in the BAC system 12 is used to facilitate determining an optimum area of the gray scale image 50 that best correlates to the patch area 40. Specifically, the patch area 40 is incrementally positioned over the entire gray scale image 50. At each position, the patch area 40 is compared against the palm biometric data encompassed by the patch area 40 such that a correlation score is determined for each position. The correlation score indicates the correlation between the patch area 40 and a corresponding matching area of the gray scale image 50. Comparing the patch area 40 against the gray scale image 50 and generating the correlation scores is referred to herein as applying the patch area 40 against the gray scale image 50. It should be understood that the gray scale image 50 is rotated through a series of angles and at the same time is scaled through a series of scale factors. For each rotation angle and scale factor combination, the patch area 40 is applied against the gray scale image 50.

After calculating the correlation scores for each desired rotation angle and scale factor combination, the best correlation score is determined. Optimum transformation parameters are determined to be the rotation angle and the scale factor that correspond to the best correlation score, as well as the center point coordinates of the matching area that corresponds to the best correlation score. The matching area that corresponds to the patch area 40 at the best correlation score is the optimum area of the gray scale image 50. The gray scale image 50 is then adjusted by the rotation angle and scale factor corresponding to the best correlation score, and the coordinates of the matching area in the gray scale image 50 are calculated using the second Cartesian coordinate system. The rotation angle and the scale factor of the optimum area are also referred to as the optimum rotation angle and the optimum scale factor. The optimum rotation angle, optimum scale factor and the coordinates of the optimum area, together constitute an optimum transformation parameter set. It should be understood that the authentication region of interest 48 may also be used to generate an authentication mask. Thus, by virtue of knowing the coordinates of the patch area 40 in the enrollment region of interest 24, the optimum rotation angle, the optimum scale factor, and the coordinates of the optimum area center point, a transformation necessary for substantially aligning the authentication region of interest 48 with the enrollment region of interest 24 may be calculated. Likewise, the transformation may be calculated for substantially aligning the authentication mask with an enrollment mask generated during enrollment, and for substantially aligning the gray scale image 50 with an enrollment gray scale image generated during enrollment. Thus, the transformation is applied against the authentication mask to substantially align the authentication and enrollment masks. The transformation is also applied against the gray scale image 50 to substantially align the gray scale image 50 with the enrollment gray scale image.

After aligning the authentication and enrollment masks, and aligning the gray scale image 50 and the enrollment gray scale image, a biometric template is generated from the aligned gray scale image 50. The authentication and enrollment masks are compared to determine a region common to both masks. Biometric template data generated from the aligned gray scale image 50 that is also within the common region is used to conduct a biometric authentication matching transaction. The common region may also be referred to as a region of agreement.

In the exemplary embodiment the authentication region of interest 48 is rotated, from its original orientation, through angles ranging from ten degrees clockwise to ten degrees counterclockwise. However, in other embodiments the authentication region of interest 48 may be rotated by angles greater than ten degrees in either the clockwise or counterclockwise directions. Moreover, scale factors are applied to the authentication region of interest 48 that increase and decrease the size of the region of interest 48 by up to twenty percent. However, in other embodiments other scale factors may be applied that increase or decrease the size of the authentication region of interest 48 by greater than twenty percent.

It should be understood that the authentication mask and the gray scale image 50 each include the authentication region of interest 48. Thus, all information or data included in the authentication mask and the gray scale image 50 are rotated and scaled as described above for the authentication region of interest 48. Computations relating to determination of the optimum area are conducted in the second Cartesian coordinate system.

Figure 8:
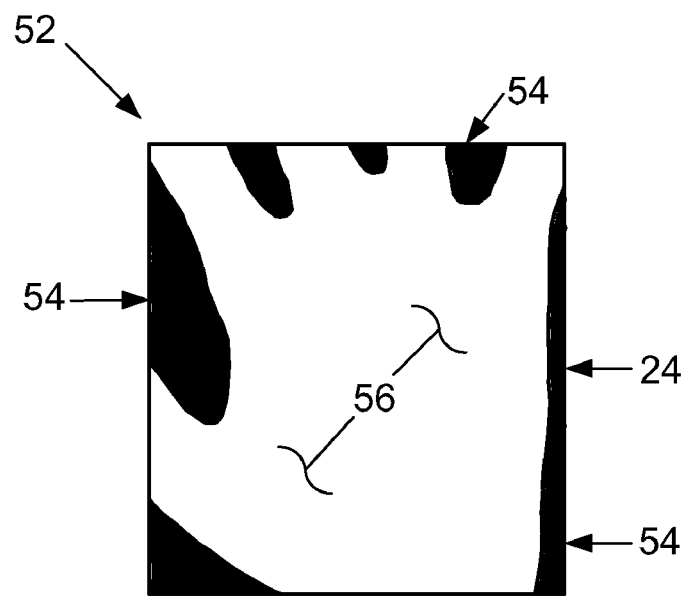
FIG. 8 is a plan view of an exemplary mask of the palm image captured during enrollment.

FIG. 8 is a plan view of an enrollment mask 52 generated from the enrollment region of interest 24 during enrollment. The enrollment mask 52 includes shaded areas that represent areas not containing valid biometric data within the enrollment region of interest 24. The mask 52 also includes another area 56 that represents areas containing valid biometric data within the enrollment region of interest 24.

Figure 9:
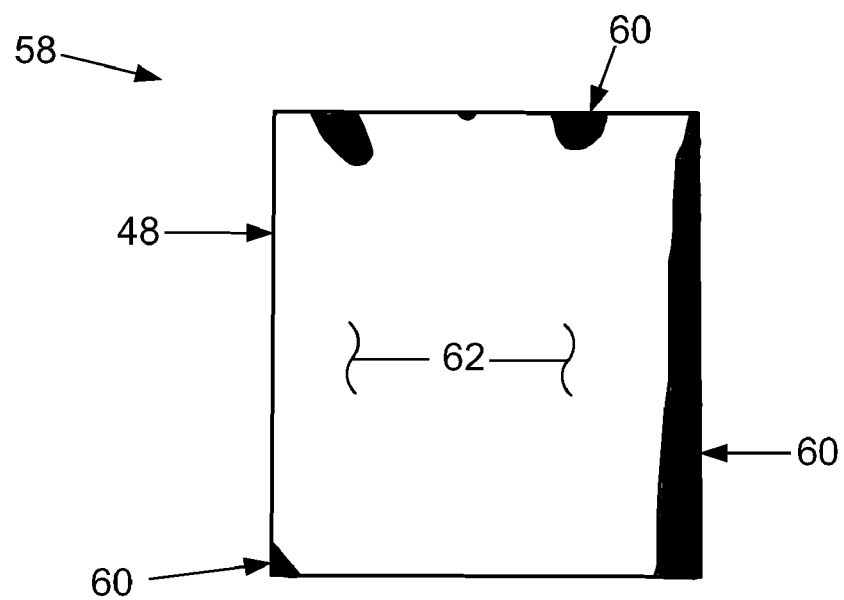
FIG. 9 is a plan view of an exemplary mask of a palm image captured during authentication.

FIG. 9 is a plan view of an authentication mask 58 generated from the authentication region of interest 48 during authentication. The mask 58 includes shaded areas 60 that represent areas not containing valid biometric data within the authentication region of interest 48. The authentication mask 58 also includes another area 62 that represents areas containing valid biometric data within the authentication region of interest 48. During authentication, the enrollment mask 52 and the authentication mask 58 are compared to define a region common to both masks 52, 58. Biometric data within the common region is used for matching during authentication.

Figure 10:
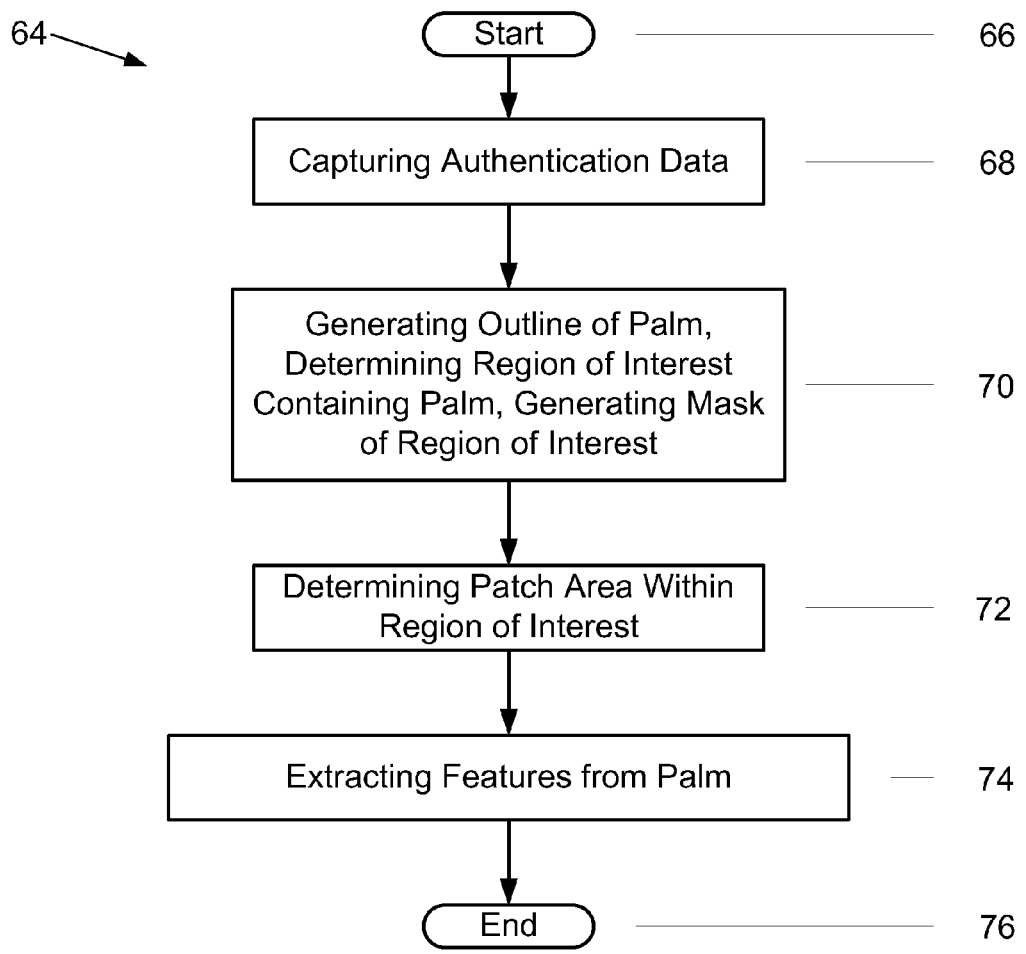
FIG. 10 is a flowchart illustrating an exemplary enrollment process.

FIG. 10 is a flowchart 64 illustrating an exemplary process for enrolling users in the BAC system 12. The enrolling process starts 66 by activating a security application stored in the device 14. The user activates the device 14. The security application causes the device 14 to display a message prompting the user to capture requested biometric data. The requested biometric data is an image of a palm of the user, including fingers. Next, processing continues by capturing biometric authentication data 68 in accordance with the message from the user with the device 14. Specifically, in the exemplary embodiment the biometric authentication data is captured by taking a picture of the user's palm, including fingers, with the device 14. Thus, the biometric data is captured and processed into an image. In the exemplary embodiment a single picture is taken during enrollment. However, in other embodiments any number of pictures may be taken that facilitate authenticating the identity of a user as described herein. The captured biometric data is communicated to the BAC system 12.

Next, processing continues by generating an outline of the palm 70, determining 70 the enrollment region of interest 24, and generating 70 the enrollment mask 52. The palm outline, enrollment region of interest 24, and enrollment mask 52 are stored in the enrollment data record of the user in the BAC system 12.

Processing continues by determining 72 the patch area 40 within the enrollment region of interest 24. Each patch area 40 is processed into a patch area template and is stored in the enrollment data record of the user. After determining 72 the patch area 40, processing continues by extracting biometric features 74 from the palm included in the enrollment region of interest 24. The extracted biometric features are processed into a biometric template which is stored in the enrollment data record of the user. After extracting the biometric features 74, a message is communicated to, and displayed on, the device 14 notifying the user that enrollment is complete. Next, enrollment processing ends 76.

Figure 11:
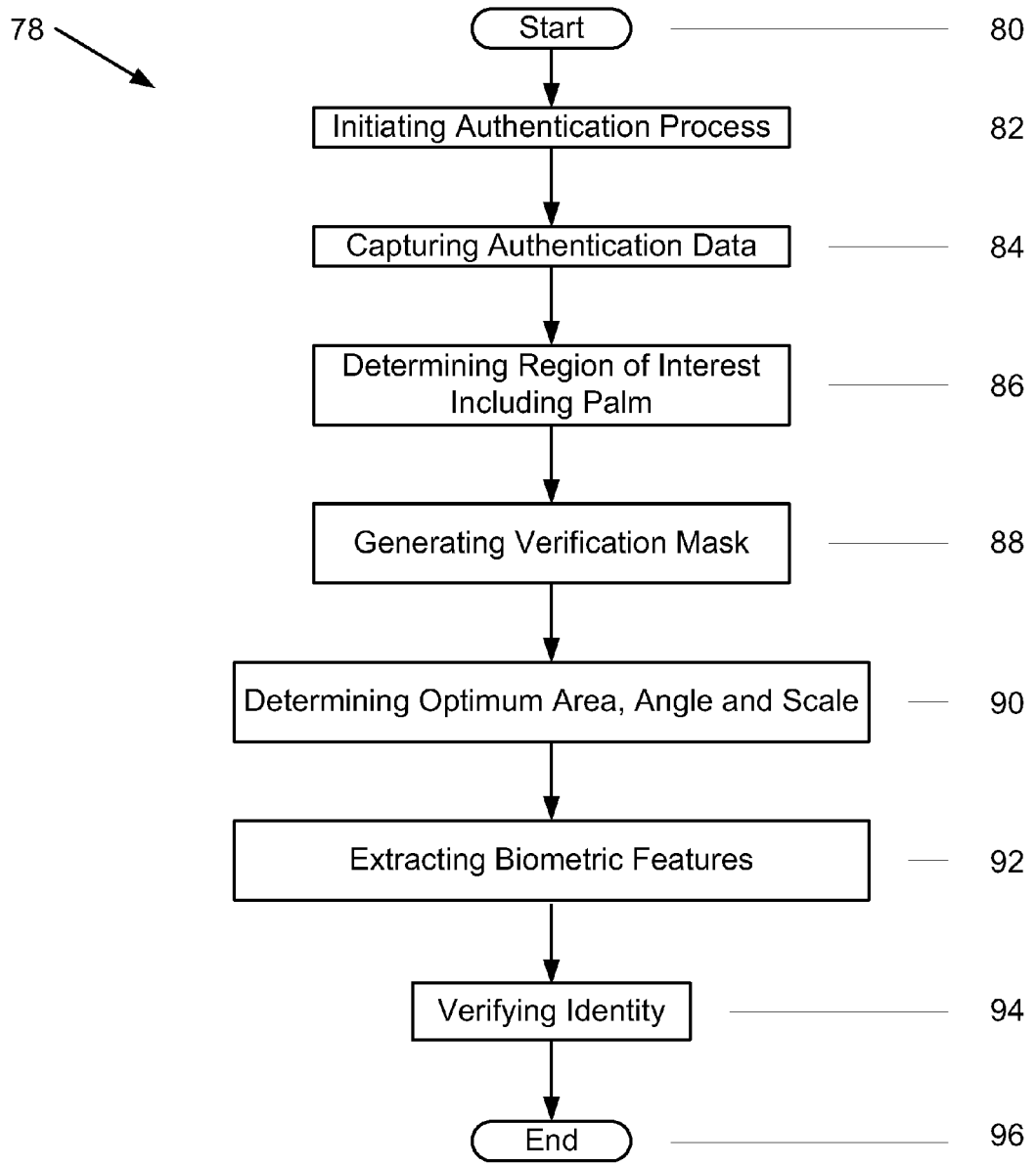
FIG. 11 is a flowchart illustrating an exemplary authentication process.

FIG. 11 is a flowchart 78 illustrating an exemplary authentication process used by the AC system 10 for authenticating the identity of a user. For AC system 10, the process starts 80 by initiating an authentication process 82. Specifically, a user initiates the authentication process by activating the security application in the device 14 when the user desires to be authenticated. It should be appreciated that the user may desire to be authenticated in many different circumstances including, but not limited to, when remotely conducting a transaction and when requested by security personnel to prove a claim of identity.

The security application causes the device 14 to display a message prompting the user to capture requested biometric data. As during enrollment, the requested biometric data is an image of the palm of the user, including fingers. Processing continues by capturing authentication data in accordance with the message by taking a picture of the user's palm with the device 14. Thus, the biometric authentication data is captured and processed into an image. The captured biometric data is communicated to the BAC system 12. In the exemplary embodiment a single picture is taken during authentication. However, in other embodiments any number of pictures may be taken.

Next, processing continues by determining 86 the authentication region of interest 48 including the palm from the captured biometric data, and generating 88 the authentication mask 58 and the gray scale image 50 for the captured biometric data. Processing continues by determining the optimum area 90 within the authentication region of interest 48, and adjusting the scale and angle of the authentication region of interest 48 such that the adjusted authentication region of interest 48 substantially aligns with the enrollment region of interest 24. The authentication and enrollment masks, and the gray scale image 50 and enrollment gray scale image are similarly substantially aligned with each other. Next, processing continues by extracting biometric features 92 from the aligned gray scale image 50 and generating biometric template data from the extracted data. The aligned authentication and enrollment masks are compared to determine the region of agreement. Biometric template data that is within the region of agreement is used to conduct a biometric verification matching transaction.

Processing continues by verifying the identity 94 of the user. Specifically, the biometric template data within the region of agreement is compared against corresponding template data of the enrollment template data record and a matching score is generated. The matching score is compared against a predetermined threshold to determine whether the identity of the user is verified. When the identity of the user is verified a message is communicated to, and displayed on, the device 14 notifying the user of the verification, and processing ends 96. When the identity of the user is not verified, a message is communicated to, and displayed on, the device 14 notifying the user that his identity was not verified, and processing ends 96.

In each embodiment, the above-described processes facilitate aligning biometric data captured during authentication with enrollment biometric data. More specifically, a transform is calculated and is applied to the biometric data captured during authentication. The transform causes the captured biometric data to have substantially the same size and orientation as the enrollment biometric data. As a result, biometric authentication data capture devices readily available to users may be used for accurate and proper authentication.

Exemplary embodiments of processes and systems that facilitate convenient, flexible and inexpensive biometric authentication based on palm biometric data are described herein. The processes are not limited to use with the specific computer system embodiments described herein, but rather, the processes can be utilized independently and separately from other processes described herein. Moreover, the invention is not limited to the embodiments of the processes and systems described above in detail. Rather, other variations of the processes may be utilized within the spirit and scope of the claims.

While the invention has been described in terms of various specific embodiments, those skilled in the art will recognize that the invention can be practiced with modification within the spirit and scope of the claims.

What is claimed is:

1. A method of calculating a transformation comprising:
   capturing biometric authentication data of a user and processing the captured biometric authentication data into an image with a communications device, and communicating the captured biometric authentication data to an authentication system;
   determining a region of interest of the image and generating a gray scale image from the image;
   rotating the gray scale image through a series of angles and scaling the gray scale image through a series of scale factors, such that the gray scale image is rotated and scaled through a plurality of rotation angle and scale factor combinations;
   comparing a patch area against biometric data of the gray scale image encompassed by the patch area at a plurality of positions on the gray scale image;

calculating a correlation score between the patch area and the gray scale image at each position on the gray scale image;

determining a best correlation score from the correlation scores;

determining an optimum area of the gray scale image corresponding to the best correlation score; and calculating a transformation from parameters associated with the optimum area.

2. A method of calculating a transformation in accordance with claim 1, said capturing operation comprising capturing at least palm biometric authentication data of the user.

3. A method of calculating a transformation in accordance with claim 1, further comprising determining the patch area during enrollment to be within an enrollment region of interest, the patch area representing a copy of a portion of biometric data captured during enrollment.

4. A method of calculating a transformation in accordance with claim 1, further comprising:

capturing biometric data from a user during enrollment;

calculating coordinates of a center of gravity of the captured enrollment biometric data; and positioning the patch area on the center of gravity such that a center of the patch area is coincident with the center of gravity.

5. A method of calculating a transformation in accordance with claim 1, said determining a region of interest operation comprising:

determining a best fit line for coordinate points of the captured biometric authentication data;

determining coordinates of two points on the best fit line and a distance between the two points;

determining the coordinates of a midpoint between the two points; and determining a first vector parallel to the best fit line and a second vector normal to the best fit line.

6. A method of calculating a transformation in accordance with claim 5, further comprising determining coordinates of each corner of the region of interest according to the equation $P_i = MP + a_1 Dv_1 + b_1 Dv_2$, where:

$P_i$ designates each corner of the region of interest;

MP designates the coordinates of the midpoint;

D designates the distance between the two points;

$v_1$ designates the first vector;

$v_2$ designates the second vector; and $a_1$ and $b_1$ designate coefficients.

7. A system for calculating a transformation comprising:

an authentication system including an authentication database, said authentication system being configured to communicate with devices and to store within said authentication database authentication data for a plurality of users; and a device configured to communicate with at least said authentication system and to capture authentication data, said authentication system being further configured to determine a region of interest of authentication data captured by said device, generate a gray scale image from the captured authentication data, rotate and scale the gray scale image such that the gray scale image is rotated and scaled through a plurality of rotation and scale factor combinations, compare a patch area against biometric data of the gray scale image encompassed by the patch area at a plurality of positions on the gray scale image, calculate a correlation score between the patch area and the gray scale image at each position on the gray scale image, determine a best correlation score of the correlation scores, determine an optimum area of the gray scale image corresponding to the best correlation score, and calculate a transformation from parameters associated with the optimum area.

8. A system for calculating a transformation in accordance with claim 7, said authentication system being further configured to determine the optimum area to be a matching area of the gray scale image that corresponds to the patch area at the best correlation score.

9. A system for calculating a transformation in accordance with claim 7, said authentication system being further configured to determine an optimum transformation parameter set corresponding to the best correlation score.

10. A system for calculating a transformation in accordance with claim 7, the transformation parameter set comprising an optimum rotation angle, a optimum scale factor and the coordinates of the optimum area.

11. A system for calculating a transformation in accordance with claim 7, wherein said device is one of the following:

a smart phone;

a television;

a tablet computer;

a desktop computer;

a laptop; and a personal digital assistant.

12. A system for calculating a transformation in accordance with claim 7, the captured authentication data being palm biometric data.

13. A system for calculating a transformation in accordance with claim 7, the patch area having a rectangular or circular shape.

14. A system for calculating a transformation in accordance with claim 7, said authentication system being further configured to determine the region of interest by constructing the region of interest as an enrollment region of interest according to the equation $P_i = MP + a_1 Dv_1 + b_1 Dv_2$, where:

$P_i$ designates each corner of the region of interest;

MP designates the coordinates of the midpoint;

D designates the distance between the two points;

$v_1$ designates the first vector;

$v_2$ designates the second vector; and $a_1$ and $b_1$ designate coefficients.

15. A system for calculating a transformation in accordance with claim 7, said authentication system being further configured to position the patch area at an area of the captured authentication data having a higher density of biometric features than other areas of the captured authentication data.

16. A system for authenticating a user in accordance with claim 7, said authentication system being further configured to:

construct the region of interest in accordance with a first coordinate system;

include a second coordinate system in the region of interest; and calculate coordinates of a center of gravity of the captured authentication data in accordance with the second coordinate system.

17. A computer program recorded on a non-transitory computer-readable recording medium included in an authentication computer system for calculating a transformation, the computer program for causing the authentication computer system to execute at least the following:

communicating a captured biometric authentication data image from a device to an authentication system;

determining an authentication region of interest of the captured biometric authentication data image and generating a gray scale image from the captured biometric authentication data image;

rotating the gray scale image through a series of angles and scaling the gray scale image through a series of scale factors, such that the gray scale image is rotated and scaled through a plurality of rotation angle and scale factor combinations;

applying a patch area against the gray scale image, the patch area representing a copy of a portion of biometric data captured from the user during enrollment;

calculating a correlation score between the patch area and the gray scale image at a plurality of positions on the gray scale image;

determining a best correlation score, the best correlation score indicating the best correlation between the patch area and a corresponding matching area of the gray scale image;

determining that the corresponding matching area is an optimum area of the gray scale image; and calculating a transformation from parameters associated with the optimum area.

18. A computer program recorded on a non-transitory computer-readable recording medium in accordance with claim 17, the computer program for causing the authentication computer system to execute said applying operation by causing the authentication computer system to execute comparing the patch area against biometric data of the gray scale image encompassed by the patch area at a plurality of positions on the gray scale image.

* * * * *